United States Patent
Oikawa et al.

(10) Patent No.: US 11,905,647 B2
(45) Date of Patent: Feb. 20, 2024

(54) THERMAL INSULATION SHEET AND METHOD FOR PRODUCING THE SAME, AND ELECTRONIC DEVICE AND BATTERY UNIT

(71) Applicant: PANASONIC INTELLECTUAL PROPERTY MANAGEMENT CO., LTD., Osaka (JP)

(72) Inventors: Kazuma Oikawa, Osaka (JP); Tooru Wada, Osaka (JP); Shinji Okada, Osaka (JP); Shigeaki Sakatani, Osaka (JP); Rikako Shono, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 528 days.

(21) Appl. No.: 17/190,279

(22) Filed: Mar. 2, 2021

(65) Prior Publication Data

US 2021/0180244 A1    Jun. 17, 2021

Related U.S. Application Data

(62) Division of application No. 16/206,809, filed on Nov. 30, 2018, now Pat. No. 11,015,286.

(30) Foreign Application Priority Data

Nov. 30, 2017 (JP) .................... 2017-229821
Oct. 10, 2018 (JP) .................... 2018-191918

(51) Int. Cl.
 D06M 11/79 (2006.01)
 D06M 13/228 (2006.01)
(Continued)

(52) U.S. Cl.
 CPC ......... *D06M 11/79* (2013.01); *C03C 25/1095* (2013.01); *C03C 25/40* (2013.01);
(Continued)

(58) Field of Classification Search
 None
 See application file for complete search history.

(56) References Cited

U.S. PATENT DOCUMENTS

2012/0097907 A1    4/2012  Bauer et al.
2015/0077957 A1    3/2015  Sakatani et al.
(Continued)

FOREIGN PATENT DOCUMENTS

| | | |
|---|---|---|
| CN | 105390461 A | 3/2016 |
| JP | 5934400 B2 | 6/2016 |
| JP | 6064149 B1 | 1/2017 |

OTHER PUBLICATIONS

Notice of Allowance issued in U.S. Appl. No. 16/206,809, dated Jan. 8, 2021.
(Continued)

*Primary Examiner* — Elizabeth Collister
(74) *Attorney, Agent, or Firm* — Rimon P.C.

(57) ABSTRACT

Used is a method for producing a thermal insulation sheet, including: composite-forming including impregnating a nonwoven fabric with a basic sol prepared by adding a carbonate ester to a water glass composition to form a hydrogel-nonwoven fabric composite; surface-modifying including mixing the composite with a silylating agent for surface modification; and drying including removing liquid contained in the composite through drying at a temperature lower than the critical temperature of the liquid under a pressure lower than the critical pressure of the liquid. Used is a thermal insulation sheet including an aerogel and a
(Continued)

nonwoven fabric, where the thermal insulation sheet exhibits a compressibility of 40% or lower at 0.30 to 5.0 MPa.

20 Claims, 11 Drawing Sheets

(51) Int. Cl.
    *D06M 15/643*     (2006.01)
    *D06M 13/232*     (2006.01)
    *C03C 25/40*     (2006.01)
    *D06M 13/513*     (2006.01)
    *C03C 25/1095*     (2018.01)
    *H01M 10/65*     (2014.01)
    *D06M 11/77*     (2006.01)

(52) U.S. Cl.
    CPC ........ *D06M 13/228* (2013.01); *D06M 13/232* (2013.01); *D06M 13/513* (2013.01); *D06M 15/643* (2013.01); *H01M 10/65* (2015.04); *D06M 11/77* (2013.01); *D06M 2200/30* (2013.01); *D06M 2400/02* (2013.01)

(56) References Cited

U.S. PATENT DOCUMENTS

| | | |
|---|---|---|
| 2016/0060808 A1 | 3/2016 | Oikawa et al. |
| 2017/0266920 A1 | 9/2017 | Oikawa et al. |
| 2019/0002356 A1* | 1/2019 | Hebalkar ................ C04B 35/82 |

OTHER PUBLICATIONS

English translation of First Office Action and Search Report dated Jan. 27, 2021, issued in corresponding Chinese Patent Application No. 201811358311.X.

* cited by examiner

Step 1

Step 2

THERMAL INSULATION SHEET AND METHOD FOR PRODUCING THE SAME, AND ELECTRONIC DEVICE AND BATTERY UNIT

This application is a Divisional application of U.S. patent application Ser. No. 16/206,809, filed on Nov. 30, 2018, now U.S. Pat. No. 11,015,286, which is entitled to and claims the benefit of Japanese Patent Application No. 2017-229821, filed on Nov. 30, 2017 and Japanese Patent Application No. 2018-191918, filed on Oct. 10, 2018, the disclosures of which including the specifications, drawings and abstracts are incorporated herein by reference in their entirety.

TECHNICAL FIELD

The present disclosure relates to a thermal insulation sheet and a method for producing the thermal insulation sheet, and an electronic device and battery unit using the thermal insulation sheet. In particular, the present disclosure relates to a high-strength thermal insulation sheet and a method for producing the thermal insulation sheet, and an electronic device and battery unit using the thermal insulation sheet.

BACKGROUND ART

To reliably control heat flow from heat-generating parts in a small space and achieve safety and prevention of fire propagation for products, thermal insulation sheets superior in compression characteristics with high performance have been demanded in the field of devices for automotive use and industrial use. Such thermal insulation sheets are expected to be applied, for example, to cell separators in lithium ion battery modules.

The safety standard for lithium ion batteries requires a fire exposure test. The fire exposure test is a test method in which a cell in a battery module is allowed to undergo thermal runaway and then it is determined whether ignition or rupture occurs as a result of thermal propagation to other cells including the adjacent cell. A safety design intended to block propagation of thermal runaway to the adjacent cell involves inclusion of a material superior in thermal insulation properties between cells. It is theoretically possible to prevent thermal propagation and fire propagation to a certain degree by using a thicker material, even if the material has high thermal conductivity.

However, battery modules are placed in devices, which restricts the space for installation and requires size limitation. Thus, resistance to fire propagation and downsizing need to be achieved in combination with higher capacity for modules, which is a difficult task.

To achieve them in combination, thin materials with high thermal insulation are desired for cell separators. In view of the expansion of cells due to the degradation and swelling of active materials during charge/discharge cycles for a battery, thermal insulation sheets are required to additionally have resistance to compression deformation. In initial assemblage of a battery module, a relatively low load of 1 MPa or lower is applied to a thermal insulation sheet as a cell separator. On the other hand, a load up to about 5 MPa may be applied to a thermal insulation sheet when a battery swells. Accordingly, it is important to consider compression characteristics in material design for thermal insulation sheets.

Silica aerogel is known as a substance with low thermal conductivity. Silica aerogel consists of a network structure in which silica particles in the order of several tens of nanometers are connected in point contact, and the average pore diameter is equal to or smaller than the mean free path of air, 68 nm. This means that silica aerogel has a thermal conductivity lower than that of still air. For this reason, silica aerogel attracts attention as a superior thermal insulation material. However, silica aerogel is considered to have a disadvantage for practical use that the strengths to various deformation modes including compression, bending, and shear are extremely low.

The present inventors have devised a thermal insulation material in the form of a thin and homogeneous sheet with improved handleability imparted by forming a composite of a silica aerogel and a nonwoven fabric (Japanese Patent No. 6064149). This thin thermal insulation sheet is superior in handleability and relatively resistant to bending.

On the other hand, a self-standing hard composite material has been devised as a high-strength thermal insulation material utilizing aerogel, the composite material obtained by molding a slurry containing a hydrophobic aerogel particle, an inorganic binder such as cement, gypsum, and lime, a surfactant, a fiber, and so forth in a container, and drying the slurry (Japanese Patent No. 5934400).

SUMMARY OF INVENTION

Technical Problem

When a conventional thermal insulation sheet is used for a battery cell or the like in a sandwiched manner, however, the aerogel is compressed and undergoes compression deformation particularly under a high load, and the thermal insulation effect is in some cases disadvantageously lowered more largely than under a low load.

Accordingly, an object of the present invention is to provide a thermal insulation sheet applicable even under a high load and a method for producing the thermal insulation sheet, and an electronic device and battery unit using the thermal insulation sheet.

Solution to Problem

In order to solve the problem mentioned above, a method for producing a thermal insulation sheet is used, the method including: composite-forming including impregnating a nonwoven fabric with a basic sol prepared by adding a carbonate ester to a water glass composition to form a hydrogel-nonwoven fabric composite; surface-modifying including mixing the composite with a silylating agent for surface modification; and drying including removing liquid contained in the composite through drying at a temperature lower than a critical temperature of the liquid under a pressure lower than a critical pressure of the liquid, in which the thermal insulation sheet exhibits a compressibility of 40% or lower at 0.30 to 5.0 MPa.

Further, a thermal insulation sheet is used, the sheet including an aerogel and a nonwoven fabric, in which the thermal insulation sheet exhibits a compressibility of 40% or lower at 0.30 to 5.0 MPa.

Further, an electronic device is used, the electronics device including the thermal insulation sheet mentioned above, in which the thermal insulation sheet is disposed between an electronic part having a heat generating property and a housing. Further, a battery unit is used, the battery unit including the thermal insulation sheet mentioned above, in which the thermal insulation sheet is disposed between batteries.

Advantageous Effects of Invention

The thermal insulation sheet according to the present disclosure exhibits a compressibility of 40% or lower at 5

MPa, which indicates resistance to compression deformation, and exhibits a thermal resistance of 0.01 $m^2K/W$ or higher in compressing at 5 MPa. Therefore, the thermal insulation sheet according to the present disclosure exerts an effect of delaying thermal conduction, which works effectively even under an environment of high-temperature compression.

DESCRIPTION OF EMBODIMENTS

Figure 1:
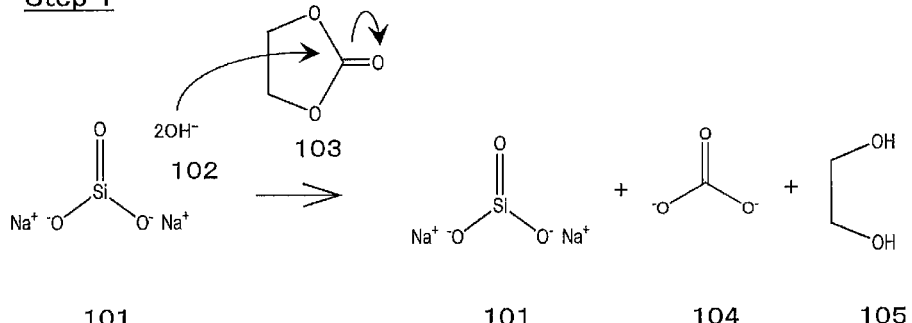
FIG. 1 shows chemical formulas for description of the mechanism of the gelling of water glass by a carbonate ester in Embodiments.
Figure 1:
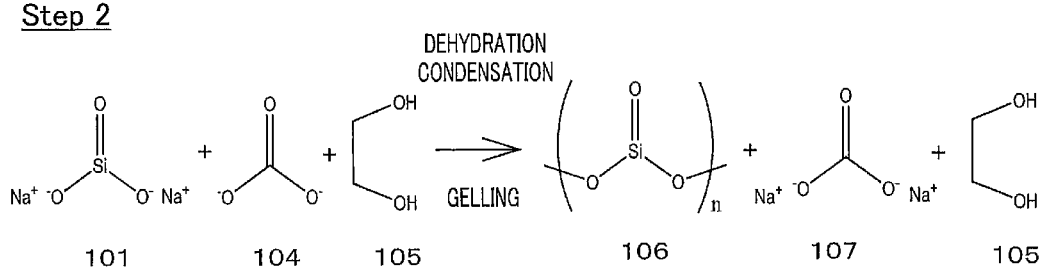

Now, the present disclosure will be described with preferred Embodiments.

<Design Concept of Thermal Insulation Sheet>

Some aerogel composite thermal insulation sheets consisting of silica aerogel and a nonwoven fabric are currently known, and most of them are increasingly improved in handleability. However, they do not exhibit both strength enough to withstand compression at 5 MPa and a high thermal resistance value such as 0.01 $m^2K/W$ or higher in compressing.

In contrast, the thermal insulation sheet in Embodiments is a thermal insulation sheet consisting of at least two components of a high-density aerogel and a nonwoven fabric, and has high strength. This is due to the "high-density aerogel" densely and tightly packed in an empty space extending in the body of the nonwoven fabric to form a composite.

Silica aerogel generally refers to a low-density silica porous body and has a bulk density lower than about 0.3 $g/cm^3$. In synthesis of silica aerogel, a low-concentration silica raw material such as alkoxysilane and water glass, and a gelling agent such as a mineral acid, a base, and an organic acid are typically used. In using water glass as a silica raw material, the silica concentration in aerogel synthesis is conventionally limited to 6 wt % or lower. This is because hydrolysis and dehydration condensation of sodium silicate rapidly progress when a mineral acid, a base, an organic acid, or another substance is added as a gelling agent. That is, if the silica concentration is 7 wt % or higher, the reaction rate is extremely high to induce heterogeneous nucleation, leading to failure in production of a homogeneous gel.

Thus, the existing synthesis method for silica aerogel does not allow high silica concentrations, and fails to provide a high-density aerogel, without mentioning failure to enhance the strength of an aerogel by imparting higher density to the aerogel. In Embodiments, in contrast, higher density can be imparted to an aerogel through production with a method described later, and a thermal insulation sheet including a high-density aerogel and a nonwoven fabric can be formed. The production method can provide a thermal insulation sheet having the following physical properties.

<Compressibility of Thermal Insulation Sheet>

The thermal insulation sheet in Embodiments exhibits a compressibility of 40% or lower, and more preferably exhibits 30% or lower in pressing at 0.30 MPa to 5 MPa. The compressibility is a value determined in measurement with a table-top type precision universal tester (e.g., Autograph AGS-X (produced by SHIMADZU Corporation)).

<Thermal Resistance of Thermal Insulation Sheet>

The thermal insulation sheet in Embodiments preferably exhibits a thermal resistance of 0.010 $m^2K/W$ or higher, and more preferably exhibits 0.015 $m^2K/W$ or higher in pressing at 0.30 MPa to 5 MPa. The thermal resistance is a value determined by dividing the thickness of the thermal insulation sheet in pressing at 0.30 MPa to 5 MPa by the following thermal conductivity.

<Thermal Conductivity of Thermal Insulation Sheet>

The thermal conductivity of the thermal insulation sheet in Embodiments depends on the level of the compressibility and cannot be uniquely specified, though the thermal conductivity is required to be 100 mW/mK or lower. The thermal conductivity is a value determined in measurement with a heat flow meter.

<Bulk Density of Thermal Insulation Sheet>

The bulk density of the thermal insulation sheet in Embodiments is preferably 0.3 $g/cm^3$ to 0.5 $g/cm^3$.

<Pore Characteristics of High-Density Aerogel>

The specific surface area of the high-density aerogel constituting the thermal insulation sheet in Embodiments is preferably 300 $m^2/g$ to 600 $m^2/g$. In addition, the pore volume is preferably smaller than 1.5 ml/g. The average pore diameter of the high-density aerogel is preferably 10 to 70 nm. The pore characteristics of the high-density aerogel are values determined in measurement with a high precision gas/vapor adsorption measurement instrument.

<Thickness of Thermal Insulation Sheet>

The thickness of the thermal insulation sheet in Embodiments is preferably in the range of 0.03 mm to 3.0 mm, and more preferably in the range of 0.05 mm to 1.5 mm. If the thickness of the thermal insulation sheet is smaller than 0.03 mm, the thermal insulation effect in the thickness direction may be lower. Heat transfer from one surface of the thermal insulation sheet to the other surface in the thickness direction cannot be reduced without achievement of very low thermal conductivity close to that of vacuum. In particular, the thermal insulation effect in the thickness direction can be ensured if the thickness of the thermal insulation sheet is 0.05 mm or larger. If the thickness of the thermal insulation sheet is larger than 1.5 mm, on the other hand, it may be difficult to install the thermal insulation sheet in devices for automotive use and industrial use. Particularly in the field of devices for automotive use, thicknesses over 3.0 mm further complicate installation of the thermal insulation sheet in a device.

<Content (Packing Ratio) of High-Density Aerogel in Thermal Insulation Sheet>

The proportion of the high-density aerogel based on the weight of the thermal insulation sheet in Embodiments varies among different optimum ranges depending on the mass per unit area, bulk density, and thickness of the nonwoven fabric, and cannot be uniquely specified. Nevertheless, the proportion of the high-density aerogel based on the weight of the thermal insulation sheet is required to be at least 50 wt % or higher. If the proportion is lower than 50 wt %, the thermal resistance is lower and in addition the strength of the thermal insulation sheet cannot be maintained. Further, the proportion is required to be 80 wt % or lower. If the proportion is higher than 80 wt %, the flexibility is insufficient, although the thermal resistance is higher, and the high-density aerogel may be removed out through repeated use.

<Raw Material of Thermal Insulation Sheet>

Now, raw material species of the nonwoven fabric and the high-density aerogel to obtain the thermal insulation sheet in Embodiments will be described.

(Nonwoven)

Mass Per Unit Area of Nonwoven Fabric

The mass per unit area of the nonwoven fabric to be used in production of the thermal insulation sheet in Embodiments is preferably 5 to 200 g/m$^2$ to maintain the minimum rigidity required for a support for the high-density aerogel. Mass per unit area corresponds to weight of a fabric per unit area.

Bulk Density of Nonwoven Fabric

To increase the content of the high-density aerogel in the thermal insulation sheet in Embodiments for further lowered thermal conductivity, the bulk density of the nonwoven fabric is preferably in the range of 100 to 500 kg/m$^3$. To form a nonwoven fabric with mechanical strength as a continuum, the bulk density is preferably at least 100 kg/m$^3$. If the bulk density of the nonwoven fabric is higher than 500 kg/m$^3$, the volume of vacancies in the nonwoven fabric is smaller so that the amount of the high-density aerogel available for packing is relatively smaller, being likely to lead to a low thermal resistance value.

Material of Nonwoven Fabric

Examples of materials available for the nonwoven fabric to be used in production of the thermal insulation sheet in Embodiments include inorganic fiber materials such as glass wool, glass paper, and rock wool; resin materials such as polyethylene terephthalate (PET), polyphenylene sulfide (PPS), polypropylene (PP), and polytetrafluoroethylene (PTFE); and natural materials such as wool and cellulose. Among them, inorganic fibers are particularly preferred.

(Raw Material Species and Gelling Agent for Synthesis of High-Density Aerogel)

Raw Material Species of High-Density Aerogel

A versatile silica raw material such as alkoxysilane and water glass is used as a raw material of the high-density aerogel. In Embodiments, water is added to a silica raw material to disperse or dissolve the silica raw material in water so that the silica concentration falls within a desired range, and the resulting dispersion or solution is used.

Na ions are inferred to have impact on formation of denser or higher-density porous structure in the high-density aerogel. For this reason, water glass, which contains Na ions, is suitably used, among the above silica raw materials. That is, a water glass composition formed by dispersing or dissolving water glass in water is suitably used. Higher silica concentrations are preferred for the raw material dispersion or solution (in particular, water glass composition) to synthesize the high-density aerogel, and the silica concentration is particularly preferably 14 to 20 wt %.

Gelling agent and reaction mechanism thereof.

In Embodiments, a carbonate ester is used as a gelling agent for the gelling of the raw material species. It is generally known that while carbonate ester does not readily change under an acidic environment, it is hydrolyzed into carbonic acid and alcohol under basic conditions. In Embodiments, carbonic acid generated through this hydrolysis is utilized for gelling.

To synthesize a novel aerogel in which a high-concentration silica composition (in particular, water glass composition) with a silica concentration of 8 wt % or higher has homogeneously gelled, the present inventors diligently conducted search and examination for a gelling agent. As a result, the present inventors found that carbonate esters allow high-concentration water glass raw materials to homogeneously gel and thus are suitable for synthesis of high-density aerogel.

The mechanism of the gelling of water glass by a carbonate ester will be described with reference to the chemical reaction formulas in FIG. 1 by using ethylene carbonate as an example.

In the first step, ethylene carbonate 103 as one of the carbonate esters is added to a basic aqueous solution of sodium silicate 101 (water glass composition) at pH 10 or higher to dissolve therein. Then, hydroxy ions 102 in the raw material (water glass composition) nucleophilically attack the carbonyl carbon of ethylene carbonate 103 to progress the hydrolysis of ethylene carbonate 103. As a result, a carbonate ion ($CO_3^{2-}$) 104 and ethylene glycol 105 are generated in the system.

In the second step, sodium silicate 101 and the carbonate ion 104 react together to progress the dehydration condensation reaction of silicic acid. At this time, sodium carbonate 107 is generated as a byproduct. As a network structure formed through siloxane bonding develops, the water glass composition loses the fluidity and gels. Thus, hydrogel 106 is obtained. Most of the ions of sodium carbonate 107 remain in hydrogel 106.

As described above, use of a carbonate ester as a gelling agent causes a reaction to proceed in two steps, and hence is characterized in that the reaction rates of the hydrolysis and dehydration condensation reaction of sodium silicate 101 can be controlled and homogeneous gelling can be achieved.

Specific examples of the carbonate ester include dimethyl carbonate, diethyl carbonate, dipropyl carbonate, ethyl methyl carbonate, ethylene carbonate, and propylene carbonate. Any carbonate ester can cause high-concentration silica raw materials (water glass composition) to homogeneously gel; however, a carbonate ester with a longer alkyl chain has higher hydrophobicity and hence has poorer water-solubility. Accordingly, dimethyl carbonate or ethylene carbonate, each of which relatively readily dissolves in water, is preferably used from the viewpoint of the solubility of carbonate ester in water and the reaction rate of hydrolysis.

If the loading of the carbonate ester is set to 1.0 to 10.0 parts by weight based on 100 parts by weight of the total amount of the silica raw material (water glass composition), a homogenous gel can be prepared. The carbonate ester dissolved or dispersed in water may be mixed with the water glass composition. The silica concentration of the water glass composition and the concentration of the gelling agent affect the gelling time, and hence a more preferred loading of the carbonate ester depends on them, and is, in terms of productivity (e.g., the impregnation rate of a basic sol into a nonwoven, described later) and the cost of the gelling agent, 3.0 to 6.0 parts by weight based on 100 parts by weight of the total amount of the water glass composition. It should be noted that the carbonate ester is not a solvent but a gelling agent.

<Method for Producing Thermal Insulation Sheet>

Figure 2:
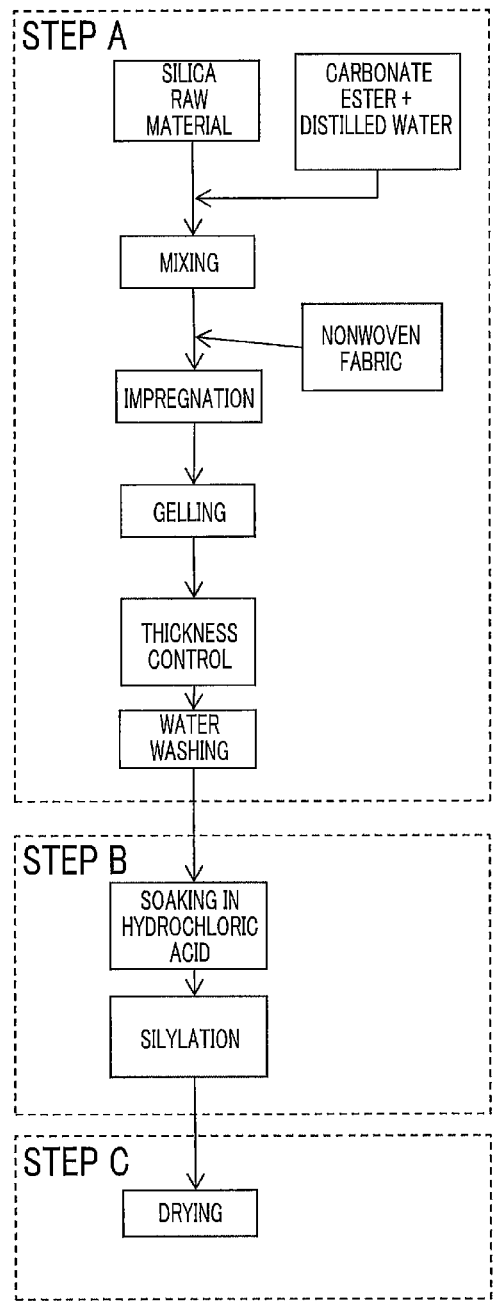
FIG. 2 shows a flowchart of a method for producing a thermal insulation sheet in Embodiments.

FIG. 2 illustrates the schematic of a method for producing the thermal insulation sheet in Embodiments. Basically, the synthesis procedure is composed of three steps of A to C.

Composite-Forming (Step A):

A nonwoven fabric is impregnated with a basic sol prepared by mixing the water glass composition with the carbonate ester, and the basic sol is allowed to gel. Subsequently, the nonwoven fabric impregnated with the basic sol is sandwiched by films, and subjected to thickness control by using a double roll or the like to form a hydrogel-nonwoven fabric composite. Then, the hydrogel-nonwoven fabric composite may be washed with water if needed, or not.

Surface-Modifying (Step B):

The hydrogel-nonwoven fabric composite formed in step A is mixed with a silylating agent for surface modification. A known silylation method and a known silylating agent can be used. Especially, a method of soaking the hydrogel-nonwoven fabric composite in aqueous solution of hydrochloric acid followed by treating the resultant with a mixed solution of siloxane and alcohol is preferred because the method allows quick silylation.

Drying (Step C):

Liquid contained in the surface-modified hydrogel-nonwoven fabric composite obtained in step B is removed through drying at a temperature lower than the critical temperature of the liquid under a pressure lower than the critical pressure of the liquid.

When the carbonate ester as a gelling agent is added to the water glass composition in step A, sodium carbonate is generated as the dehydration condensation of silicic acid proceeds, and the sodium carbonate is occasionally incorporated in the gel to provide an extremely basic hydrogel. If such a hydrogel is soaked in hydrochloric acid in step B, a neutralization reaction between hydrochloric acid and sodium carbonate occurs to rapidly generate carbon dioxide gas. In using a nonwoven fabric with less tangling of fibers such as glass paper, the generation of carbon dioxide gas may cause formation of many bubbles in the fiber sheet. In view of this, sodium carbonate in the hydrogel may be removed through water washing in advance of soaking in hydrochloric acid (step B).

EXAMPLES

Hereinafter, Embodiments will be described on the basis of Examples. However, Embodiments are never limited to the following Examples. Reactions were all performed in the atmosphere.

<Evaluation>

In Examples, ethylene carbonate was used as a gelling agent, and thermal insulation sheets were produced by using different silica concentrations for the water glass composition. The bulk density, thermal conductivity, compressibility, and thermal resistance value of each of the thermal insulation sheets obtained were evaluated in the following manner.

The bulk density of each of the thermal insulation sheets obtained was determined from the volume and the weight. In measuring the thermal conductivity of a thermal insulation sheet, the heat flow meter HFM 436 Lambda (produced by NETZSCH) was used. In measuring the compressibility of a thermal insulation sheet, the table-top type precision universal tester Autograph AGS-X (produced by SHIMADZU Corporation) was used.

The thermal resistance value of a thermal insulation sheet was calculated by dividing the thickness of the thermal insulation sheet determined from the compressibility at a pressing pressure of 5 MPa by the thermal conductivity.

Additionally, the fine structure of silica aerogel (gel packing ratio, specific surface area, pore volume, and average pore diameter) was evaluated. These were evaluated by using the high precision gas/vapor adsorption measurement instrument BELSORP-max 42N-VP-P (produced by MicrotracBEL Corp.).

Details of Examples and Comparative Examples are described in the following, and the results are shown in Table 1.

TABLE 1

| | | Example 1 | Example 2 | Example 3 | Example 4 | Example 5 | Example 6 | Example 7 | Example 8 |
|---|---|---|---|---|---|---|---|---|---|
| Raw material species/SiO$_2$ concentration [wt %] | | WG 14 | ← 16 | ← 18 | ← 20 | ← ← | ← ← | ← ← | ← ← |
| Gelling agent/loading [parts by weight] | | ECaq. 6 | ← 3 | ← ← | ← ← | ← ← | ← 4 | ← 5 | ← 6 |
| Nonwoven fabric species/thickness [mmt] | | GP 0.63 | ← ← | ← ← | ← ← | ← 1.03 | ← ← | ← ← | ← ← |
| Thermal insulation sheet | Thickness [mm] | 1.12 | 0.98 | 0.95 | 1.05 | 1.06 | 1.05 | 1.08 | 1.02 |
| | Weight [g] | 4.94 | 5.45 | 5.85 | 6.73 | 6.68 | 6.70 | 7.15 | 6.64 |
| | (1) Bulk density [g/cm$^3$] | 0.31 pass | 0.39 pass | 0.42 pass | 0.44 pass | 0.44 pass | 0.44 pass | 0.46 pass | 0.45 pass |
| | (2) Thermal conductivity [mW/mK] | 35.5 pass | 40.7 pass | 47.7 pass | 55.8 pass | 44.8 pass | 43.8 pass | 48.3 pass | 46.3 pass |

TABLE 1-continued

| Pore characteristics of aerogel | (3) Gel packing ratio [wt %] | 70 pass | 73 pass | 75 pass | 79 pass | 69 pass | 68 pass | 70 pass | 67 pass |
|---|---|---|---|---|---|---|---|---|---|
| | (4) Specific surface area [$m^2/g$] | 380 pass | — — | — — | 442 pass | 415 pass | 330 pass | 336 pass | 360 pass |
| | (5) Pore volume [$cm^3/g$] | 0.53 pass | — — | — — | 0.75 pass | 0.40 pass | 0.52 pass | 0.46 pass | 0.40 pass |
| | Average pore diameter [nm] | 33 | — | — | 33 | 12 | 25 | 16 | 16 |
| (6) Compressibility @ 5 MPa [%] | | 35.8 pass | 30.1 pass | 23.3 pass | 21.3 pass | 21.0 pass | 14.1 pass | 13.8 pass | 10.4 pass |
| (7) Thermal resistance @ 5 MPa [$m^2K/W$] | | 0.020 pass | 0.017 pass | 0.015 pass | 0.015 pass | 0.026 pass | 0.025 pass | 0.022 pass | 0.023 pass |
| (8) Overall evaluation | | pass | pass | pass | pass | pass | pass | pass | pass |

| | | Comparative Example 1 | Comparative Example 2 | Comparative Example 3 | Comparative Example 4 | Comparative Example 5 | Comparative Example 6 |
|---|---|---|---|---|---|---|---|
| Raw material species/SiO₂ concentration [wt %] | | ← 6 | ← 8 | ← 10 | ← 12 | ← 6 | ← ← |
| Gelling agent/loading [parts by weight] | | ← ← | ← ← | ← ← | ← ← | HClaq. 3.5 | NH₃aq. 3 × 10⁻⁵ |
| Nonwoven fabric species/thickness [mmt] | | ← ← | ← ← | ← ← | ← ← | ← ← | ← ← |
| Thermal insulation sheet | Thickness [mm] | 0.90 | 0.95 | 0.99 | 0.99 | 0.85 | 0.89 |
| | Weight [g] | 2.57 | 2.87 | 3.21 | 3.52 | 2.66 | 2.58 |
| | (1) Bulk density [$g/cm^3$] | 0.20 fail | 0.21 fail | 0.22 fail | 0.25 fail | 0.22 fail | 0.20 fail |
| | (2) Thermal conductivity [mW/mK] | 19.4 pass | 20.7 pass | 24.6 pass | 29.9 pass | 18.3 pass | 17.9 pass |
| Pore characteristics of aerogel | (3) Gel packing ratio [wt %] | 44 fail | 50 pass | 54 pass | 60 pass | 44 fail | 44 fail |
| | (4) Specific surface area [$m^2/g$] | 676 fail | — — | 524 fail | — — | 535 fail | 758 fail |
| | (5) Pore volume [$cm^3/g$] | 3.50 fail | — — | 1.89 fail | — — | 2.02 fail | 4.40 fail |
| | Average pore diameter [nm] | 59 | — | 59 | — | 38 | 28 |
| (6) Compressibility @ 5 MPa [%] | | 72.5 fail | 67.3 fail | 63.8 fail | 52.4 fail | 71.9 fail | 74.6 fail |
| (7) Thermal resistance @ 5 MPa [$m^2K/W$] | | 0.013 pass | 0.015 pass | 0.015 pass | 0.016 pass | 0.013 pass | 0.013 pass |
| (8) Overall evaluation | | fail | fail | fail | fail | fail | fail |

WG; water glass,
EC aq.; aqueous solution of ethylene carbonate,
HCl aq.; aqueous solution of hydrochloric acid,
NH₃ aq.; aqueous ammonia,
GP; glass paper <Criteria for Passing>
Criteria for passing in the evaluations were as follows.
(1) Evaluation of Bulk Density
Thermal insulation sheets having a bulk density of 0.3 g/cm³ or higher and 0.5 g/cm³ or lower were determined to pass. If the bulk density of a thermal insulation sheet is lower than 0.3 g/cm³, the thermal insulation sheet easily undergoes compression deformation when being pressed. If the bulk density of a thermal insulation sheet is higher than 0.5 g/cm³, the thermal insulation sheet is resistant to compression deformation due to pressing, but the thermal conductivity is higher and the thermal resistance is lower. For this reason, thermal propagation is likely to occur with the thermal insulation sheet in compressing.
(2) Evaluation of Thermal Conductivity
Thermal insulation sheets having a thermal conductivity of 100 mW/mK or lower were determined to pass. If the thermal conductivity of a thermal insulation sheet is higher than 100 mW/mK, the thermal resistance is lower, and hence thermal propagation is likely to occur in compressing.
(3) Gel Packing Ratio
Thermal insulation sheets having an aerogel packing ratio of 50 wt % or higher and 80 wt % or lower were determined to pass. If the aerogel packing ratio is lower than 50 wt %, the thermal insulation sheet easily undergoes compression deformation and the thermal resistance becomes lower in compressing. If the aerogel packing ratio is higher than 80 wt %, the thermal insulation sheet is resistant to compression deformation, but the thermal resistance may become lower in compressing because of the increased solid heat-transferring part.
(4) Evaluation of Specific Surface Area
Thermal insulation sheets in which the specific surface area of aerogel was 300 m²/g or larger and 600 m²/g or smaller were determined to pass. If the specific surface area of aerogel in a thermal insulation sheet is smaller than 300 m²/g, the thermal conductivity is higher and the thermal resistance is lower because of the larger particle diameter of particles constituting the porous body. As a result, thermal propagation is likely to occur in compressing. If the specific surface area of aerogel in a thermal insulation sheet is larger than 600 m²/g, on the other hand, the thermal insulation sheet easily undergoes compression deformation in compressing because of the smaller particle diameter of particles constituting the porous body. As a result, the thermal resistance becomes lower and thermal propagation is likely to occur.
(5) Evaluation of Pore Volume
Thermal insulation sheets having a pore volume of smaller than 1.5 ml/g were determined to pass. If the pore volume of a thermal insulation sheet is 1.5 ml/g or larger, the thermal insulation sheet easily undergoes compression deformation in compressing. As a result, the thermal resistance becomes lower and thermal propagation is likely to occur.

(6) Evaluation of Compressibility

Thermal insulation sheets which exhibited a compressibility of 40% or lower at 5.0 MPa were determined to pass. To effectively prevent thermal propagation even at a high load, a thermal insulation sheet is required to withstand compression to a certain degree to inhibit the increase of the solid heat-transferring part. If a thermal insulation sheet exhibits a compressibility of higher than 40% at 5.0 MPa, superiority to conventional thermal insulation sheets is lost.

(7) Evaluation of Thermal Resistance Value

Thermal insulation sheets which exhibited a thermal resistance value of 0.01 m$^2$K/W or higher in compressing at 5.0 MPa were determined to pass. In evaluation of a thermal resistance value, it is required for measurement of thermal conductivity to actually apply a load. Particularly in the case of a high load, however, compression causes compression deformation, which complicates measurement of thermal conductivity in compressing. In view of this, a thermal resistance value was calculated from the thickness of a thermal insulation sheet determined from the compressibility and a value of thermal conductivity measured by using the heat flow meter HFM, and used for comparative evaluation. If a thermal resistance value of lower than 0.01 m$^2$K/W is exhibited at 5.0 MPa, thermal propagation is likely to occur in compressing.

(8) Overall Evaluation

Thermal insulation sheets satisfying all of the criteria were determined to pass the overall evaluation.

Example 1

To 100 parts by weight (20.5 g) of a water glass composition (silica concentration: 14 wt %) prepared by diluting a water glass raw material with distilled water, 6 parts by weight of aqueous solution of ethylene carbonate (white crystal) (amount of ethylene carbonate: 1.23 g) was added, and the resultant was thoroughly stirred to dissolve the water glass composition, and thus a basic sol (hereinafter, also referred to as "sol solution") was prepared.

The sol solution was then poured onto a nonwoven fabric (material: glass paper, thickness: 0.63 mm, mass per unit area: 100 g/m$^2$, dimensions: 12 cm square) to homogeneously impregnate the nonwoven fabric with the sol solution. The nonwoven impregnated with the sol solution was sandwiched between PP films (thickness: 50 μm, two sheets), and the resultant was left to stand at room temperature, 23° C., for 3 minutes for the gelling of the sol. After completion of the gelling was confirmed, the impregnated nonwoven with the films was passed through a double roll with the gap set at 1.00 mm (including film thickness) to squeeze out excessive gel from the nonwoven, thereby controlling the thickness to 1.00 mm.

Subsequently, the films were peeled off, and the gel sheet was soaked in 6 N hydrochloric acid, and then left to stand at normal temperature, 23° C., for 10 minutes to allow the gel sheet to incorporate hydrochloric acid. The gel sheet was then soaked in a mixed solution of octamethyltrisiloxane as a silylating agent and 2-propanol (IPA), and reacted in a thermostatic tank at 55° C. for 2 hours. As trimethylsiloxane bonds were formed, hydrochloric acid solution was discharged from the gel sheet, resulting in a state of two separated liquids (upper layer: siloxane, lower layer: hydrochloric acid solution, 2-propanol). The gel sheet was transferred in a thermostatic tank set at 150° C., and dried in the atmosphere for 2 hours to afford a thermal insulation sheet.

This thermal insulation sheet was evaluated for thermal conductivity and compression characteristics to find that the compressibility was 35.8% and the thermal resistance value was 0.02 m$^2$K/W, and thus passed the overall evaluation.

Example 2

A sheet was produced under process conditions identical to those in Example 1 except that the silica concentration of the water glass composition was changed to 16 wt % and the loading of the aqueous solution of ethylene carbonate was changed to 3 parts by weight. This thermal insulation sheet was evaluated to find that the compressibility was 30.1% and the thermal resistance value was 0.017 m$^2$K/W, and thus passed the overall evaluation.

Example 3

A sheet was produced under process conditions identical to those in Example 2 except that the silica concentration of the water glass composition was changed to 18 wt %. This thermal insulation sheet was evaluated to find that the compressibility was 23.3% and the thermal resistance value was 0.015 m$^2$K/W, and thus passed the overall evaluation.

Example 4

A sheet was produced under process conditions identical to those in Example 2 except that the silica concentration of the water glass composition was changed to 20 wt %. This thermal insulation sheet was evaluated to find that the compressibility was 21.3% and the thermal resistance value was 0.015 m$^2$K/W, and thus passed the overall evaluation.

Example 5

A sheet was produced under process conditions identical to those in Example 4 except that the thickness of the glass paper was changed to 1.03 mm. This thermal insulation sheet was evaluated to find that the compressibility was 21.0% and the thermal resistance value was 0.026 m$^2$K/W, and thus passed the overall evaluation.

Example 6

A sheet was produced under process conditions identical to those in Example 5 except that the loading of the aqueous solution of ethylene carbonate was changed to 4 parts by weight. This thermal insulation sheet was evaluated to find that the compressibility was 14.1% and the thermal resistance value was 0.025 m$^2$K/W, and thus passed the overall evaluation.

Example 7

A sheet was produced under process conditions identical to those in Example 5 except that the loading of the aqueous solution of ethylene carbonate was changed to 5 parts by weight. This thermal insulation sheet was evaluated to find that the compressibility was 13.8% and the thermal resistance value was 0.022 m$^2$K/W, and thus passed the overall evaluation.

Example 8

A sheet was produced under process conditions identical to those in Example 5 except that the loading of the aqueous solution of ethylene carbonate was changed to 6 parts by weight. This thermal insulation sheet was evaluated to find that the compressibility was 10.4% and the thermal resistance value was 0.023 m²K/W, and thus passed the overall evaluation.

Comparative Example 1

A sheet was produced under process conditions identical to those in Example 1 except that the silica concentration of the water glass composition was changed to 6 wt %. This thermal insulation sheet was evaluated to find that the compressibility was 72.5% and the thermal resistance value was 0.013 m²K/W, and thus failed in the overall evaluation.

Comparative Example 2

A sheet was produced under process conditions identical to those in Example 1 except that the silica concentration of the water glass composition was changed to 8 wt %. This thermal insulation sheet was evaluated to find that the compressibility was 67.3% and the thermal resistance value was 0.015 m²K/W, and thus failed in the overall evaluation.

Comparative Example 3

A sheet was produced under process conditions identical to those in Example 1 except that the silica concentration of the water glass composition was changed to 10 wt %. This thermal insulation sheet was evaluated to find that the compressibility was 63.8% and the thermal resistance value was 0.015 m²K/W, and thus failed in the overall evaluation.

Comparative Example 4

A sheet was produced under process conditions identical to those in Example 1 except that the silica concentration of the water glass composition was changed to 12 wt %. This thermal insulation sheet was evaluated to find that the compressibility was 52.4% and the thermal resistance value was 0.016 m²K/W, and thus failed in the overall evaluation.

Comparative Example 5

A sheet was produced under process conditions identical to those in Example 1 except that the silica concentration of the water glass composition was changed to 6 wt % and 12 N hydrochloric acid was used as a gelling agent. This thermal insulation sheet was evaluated to find that the compressibility was 71.9% and the thermal resistance value was 0.013 m²K/W, and thus failed in the overall evaluation.

Comparative Example 6

A sheet was produced under process conditions identical to those in Example 1 except that Na ions were removed from the water glass composition having a silica concentration of 6 wt % with an ion-exchange resin to prepare a sol and 1 N aqueous solution of ammonia was used as a gelling agent for the sol. This thermal insulation sheet was evaluated to find that the compressibility was 74.6% and the thermal resistance value was 0.013 m²K/W, and thus failed in the overall evaluation.

<Evaluation of Each Item>

Compression Characteristics of Thermal Insulation Sheet

Figure 3:
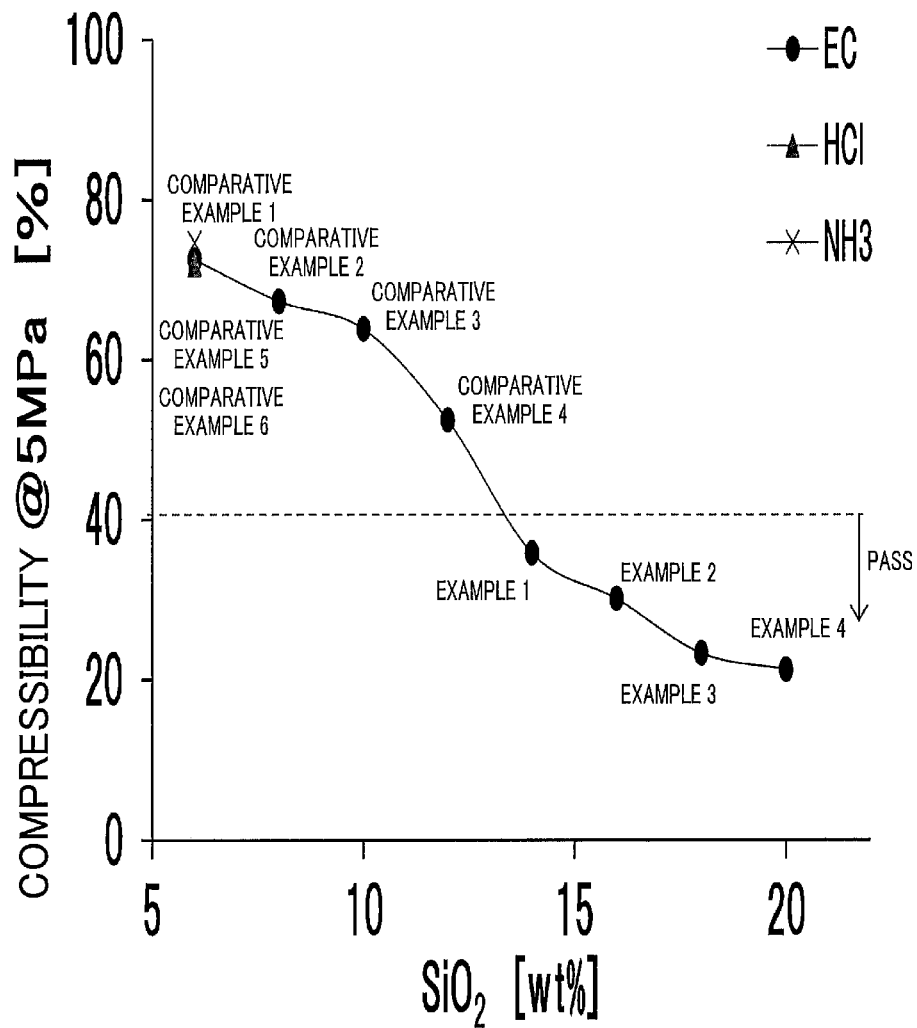
FIG. 3 illustrates the relation between the $SiO_2$ concentration of a water glass composition and the compressibility of a thermal insulation sheet in Embodiments.

The thermal insulation sheet in Embodiments preferably exhibits a compressibility of 40% or lower, and more preferably 30% or lower in pressing at 0.30 to 5 MPa. FIG. 3 shows a graph representing the relation between the compressibility in pressing at 5 MPa and the silica concentration of the water glass composition for thermal insulation sheets produced in Examples and Comparative Examples. If the compressibility is higher than 40%, it is difficult to prevent thermal propagation in compressing. If the compressibility is 30% or lower, thermal propagation in compressing can be effectively prevented.

Thermal Resistance of Thermal Insulation Sheet

Figure 4:
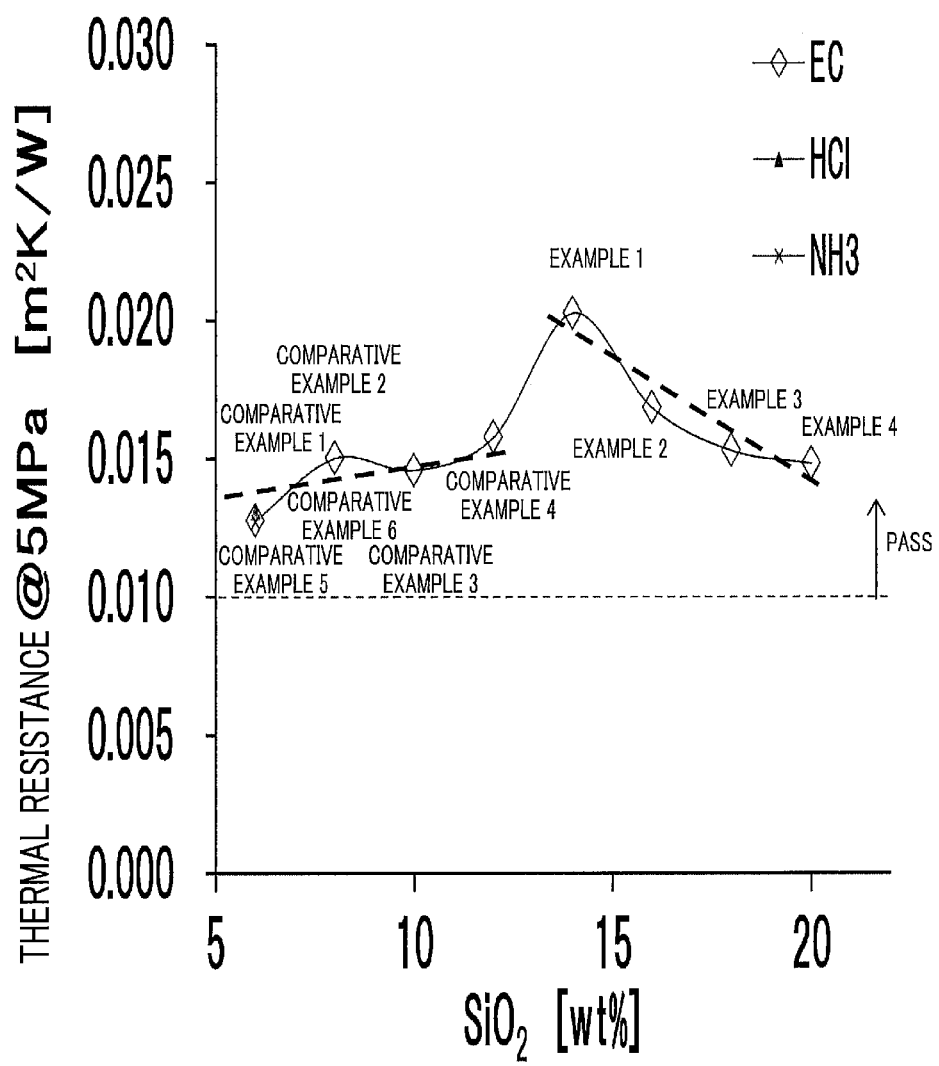
FIG. 4 illustrates the relation between the $SiO_2$ concentration of a water glass composition and the thermal resistance of a thermal insulation sheet in Embodiments.

The thermal insulation sheet in Embodiments preferably exhibits a thermal resistance of 0.010 m²K/W or higher, and more preferably exhibits 0.015 m²K/W or higher in pressing at 0.30 to 5 MPa. FIG. 4 shows a graph representing the relation between the thermal resistance in pressing at 5 MPa and the silica concentration of the water glass composition for thermal insulation sheets produced in Examples and Comparative Examples. If the thermal resistance is lower than 0.010 m²K/W, it is difficult to prevent thermal propagation in compressing. If the thermal resistance is 0.015 m²K/W or higher, thermal propagation in compressing can be effectively prevented.

Thermal Conductivity of Thermal Insulation Sheet

Figure 5:
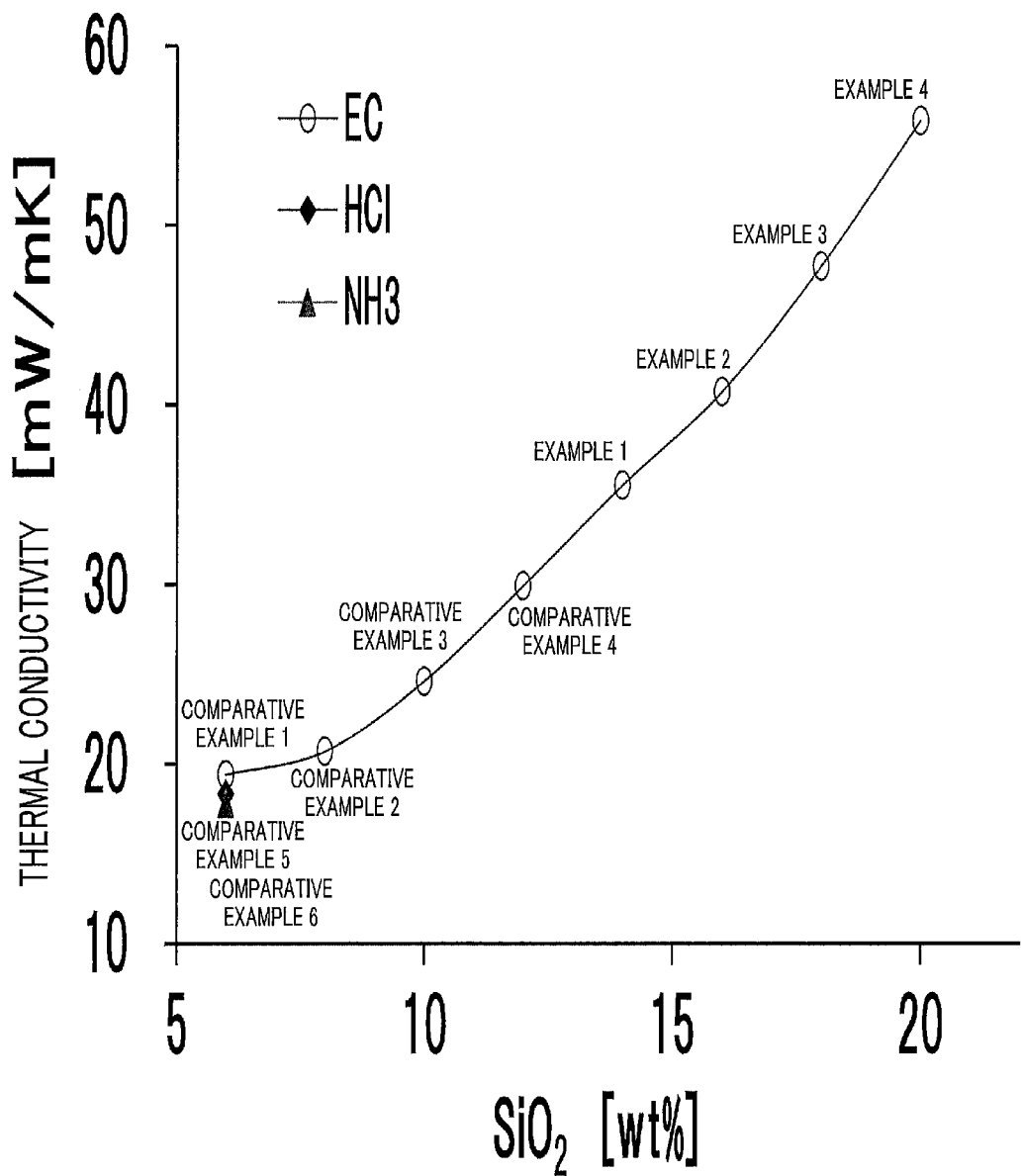
FIG. 5 illustrates the relation between the $SiO_2$ concentration of a water glass composition and the thermal conductivity of a thermal insulation sheet in Embodiments.

The thermal conductivity of the thermal insulation sheet in Embodiments depends on the level of the compressibility and cannot be uniquely specified, though the thermal conductivity is required to be 100 mW/mK or lower. FIG. 5 shows a graph representing the relation between the thermal conductivity and the silica concentration of the water glass composition for thermal insulation sheets produced in Examples and Comparative Examples. If the thermal conductivity is higher than 100 mK/W, it is difficult to prevent thermal propagation in compressing.

Bulk Density of Thermal Insulation Sheet

Figure 6:
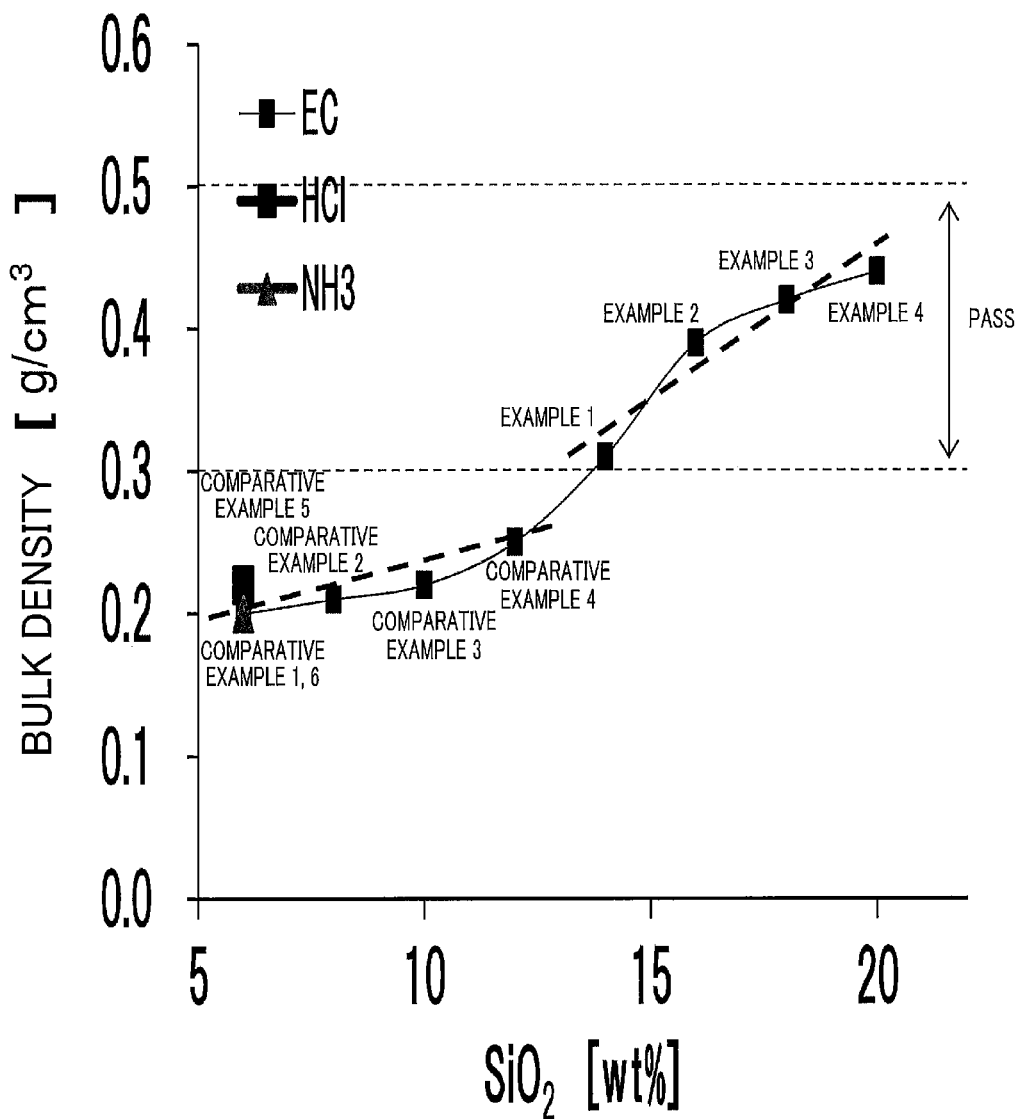
FIG. 6 illustrates the relation between the $SiO_2$ concentration of a water glass composition and the bulk density of a thermal insulation sheet in Embodiments.

The bulk density of the thermal insulation sheet in Embodiments is preferably 0.3 to 0.5 g/cm³. FIG. 6 shows a graph for thermal insulation sheets produced in Examples and Comparative Examples, in which the silica concentration of the water glass composition in production of a thermal insulation sheet is plotted on the horizontal axis and the bulk density of the resulting thermal insulation sheet is plotted on the vertical axis. It can be seen from FIG. 6 that when ethylene carbonate was used, the bulk density of a thermal insulation sheet tended to increase as the silica concentration increased. When hydrochloric acid or aqueous ammonia was used, in contrast, the bulk density was 0.2 g/cm³ at a silica concentration of 6 wt %. If the bulk density is lower than 0.3 g/cm³, the thermal insulation sheet easily undergoes compression deformation when being applied with a high load. Hence, the compressibility is higher and as a result the thermal resistance becomes lower. If the bulk density is higher than 0.5 g/cm³, the silica primary particle is significantly coarse or the aerogel itself has shrunk, and a desired thermal resistance value cannot be achieved even when no load is applied.

Specific Surface Area of Aerogel

Figure 7:
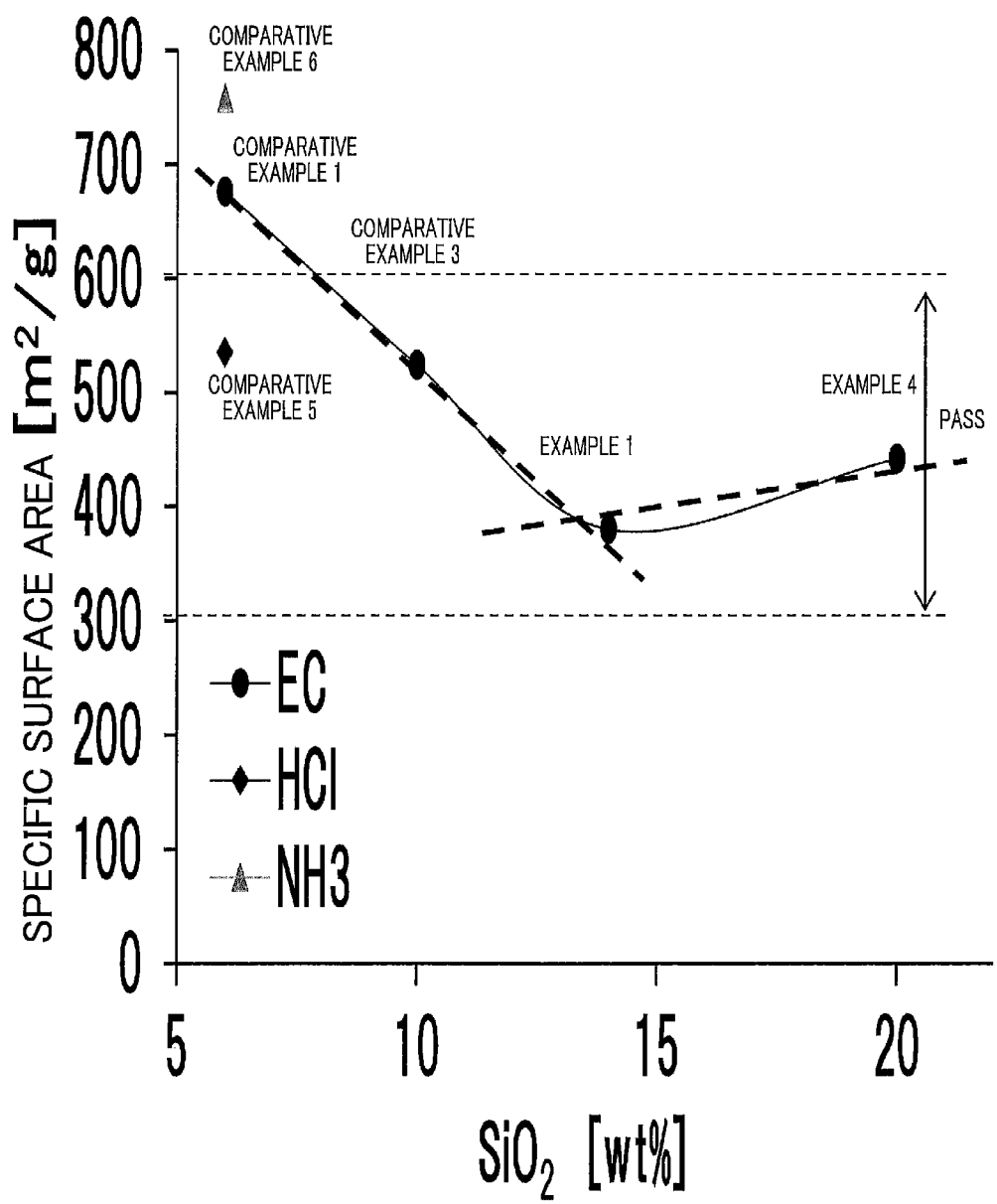
FIG. 7 illustrates the relation between the $SiO_2$ concentration of a water glass composition and the specific surface area of an aerogel in Embodiments.

The specific surface area of the high-density aerogel in Embodiments is preferably 300 to 600 m²/g. FIG. 7 shows a graph for thermal insulation sheets produced in Examples 1 and 4 and Comparative Examples, in which the silica concentration of the water glass composition in production of a thermal insulation sheet is plotted on the horizontal axis and the specific surface area of the aerogel is plotted on the vertical axis. It can be seen from FIG. 7 that when ethylene carbonate was used, the specific surface area of the aerogel tended to gradually decrease as the silica concentration increased, and reach the minimum around a silica concentration of 14 wt %.

The specific surface area was about 500 $m^2/g$ at a silica concentration of 6 wt % when hydrochloric acid was used, and was about 750 $m^2/g$ at a silica concentration of 6 wt % when aqueous ammonia was used. If the specific surface area is smaller than 300 $m^2/g$, the silica primary particle is significantly coarse or the aerogel itself has shrunk, and a desired thermal resistance value cannot be achieved even when no load is applied. If the specific surface area is larger than 600 $m^2/g$, the silica primary particle is significantly fine or the aerogel has lowered density, and a desired thermal resistance value cannot be achieved when a high load is applied. In contrast to the specific surface area of common low-density aerogel, which is larger than 600 $m^2/g$, the specific surface area in Embodiments reflects a result of the very small silica primary particle and the low bulk density of the aerogel formed.

Pore Volume of Aerogel

Figure 8:
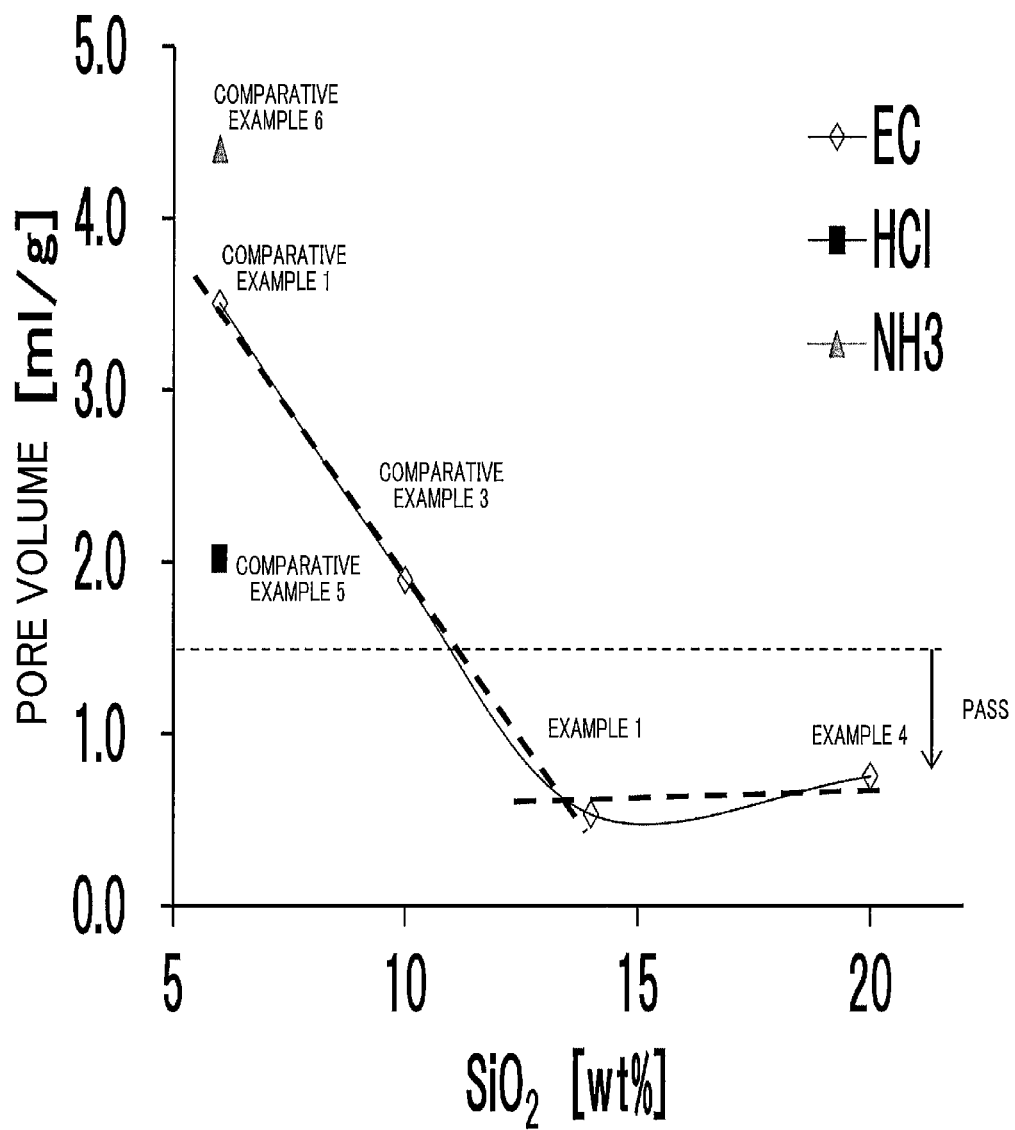
FIG. 8 illustrates the relation between the $SiO_2$ concentration of a water glass composition and the pore volume of an aerogel in Embodiments.

FIG. 8 shows a graph for thermal insulation sheets produced in Examples 1 and 4 and Comparative Examples, in which the silica concentration of the water glass composition in production of a thermal insulation sheet is plotted on the horizontal axis and the pore volume of the aerogel is plotted on the vertical axis. It can be seen from FIG. 8 that when ethylene carbonate was used, the pore volume of the aerogel tended to gradually decrease as the silica concentration increased, and reach the minimum around a silica concentration of 14 wt %. The pore volume was 2.0 ml/g at a silica concentration of 6 wt % when hydrochloric acid was used, and the pore volume was 4.4 ml/g at a silica concentration of 6 wt % when aqueous ammonia was used. If the pore volume is 1.5 ml/g or larger, the thermal insulation sheet easily undergoes compression deformation when a high load is applied, and the compressibility is larger and as a result the thermal resistance becomes lower.

Average Pore Diameter of Aerogel

Figure 9:
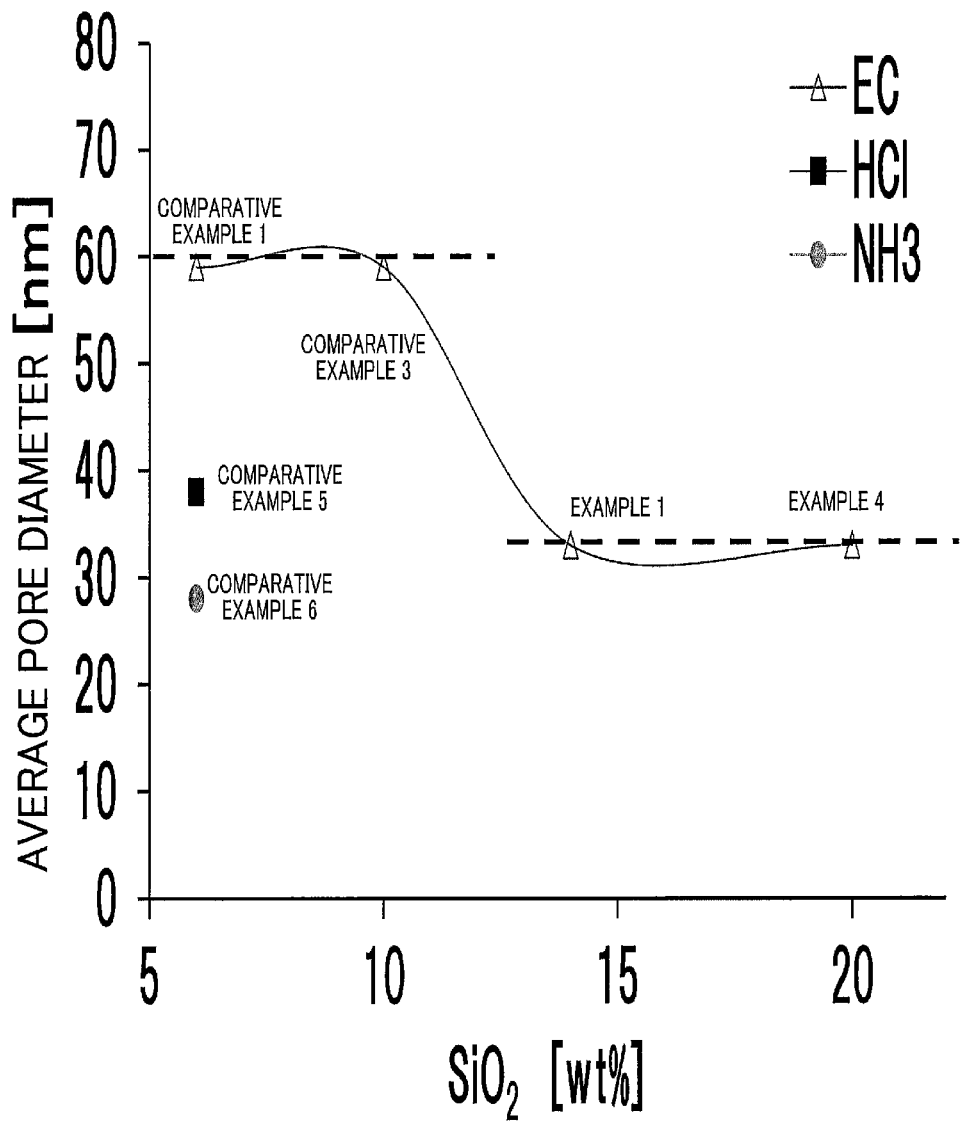
FIG. 9 illustrates the relation between the $SiO_2$ concentration of a water glass composition and the average pore diameter of an aerogel in Embodiments.

FIG. 9 shows a graph for thermal insulation sheets produced in Examples 1 and 4 and Comparative Examples, in which the silica concentration of the water glass composition in production of a thermal insulation sheet is plotted on the horizontal axis and the average pore diameter of the aerogel is plotted on the vertical axis. It can be seen from FIG. 9 that when ethylene carbonate was used, the average pore diameter was about 60 nm at silica concentrations of 10 wt % or lower, and the average pore diameter was about 30 to 40 nm at silica concentrations of 14 wt % or higher. The average pore diameter was approximately 40 nm at a silica concentration of 6 wt % when hydrochloric acid was used, and the average pore diameter was approximately 30 nm at a silica concentration of 6 wt % when aqueous ammonia was used. If the average pore diameter is smaller than 10 nm, the silica primary particle is significantly coarse or the aerogel itself has shrunk, and a desired thermal resistance value cannot be achieved even when no load is applied. If the average pore diameter is larger than 70 nm, it is difficult to suppress air convection, resulting in lower thermal resistance. Thus, the average pore diameter of the aerogel is preferably 10 to 70 nm.

Silica Concentration and Compressibility

Figure 10:
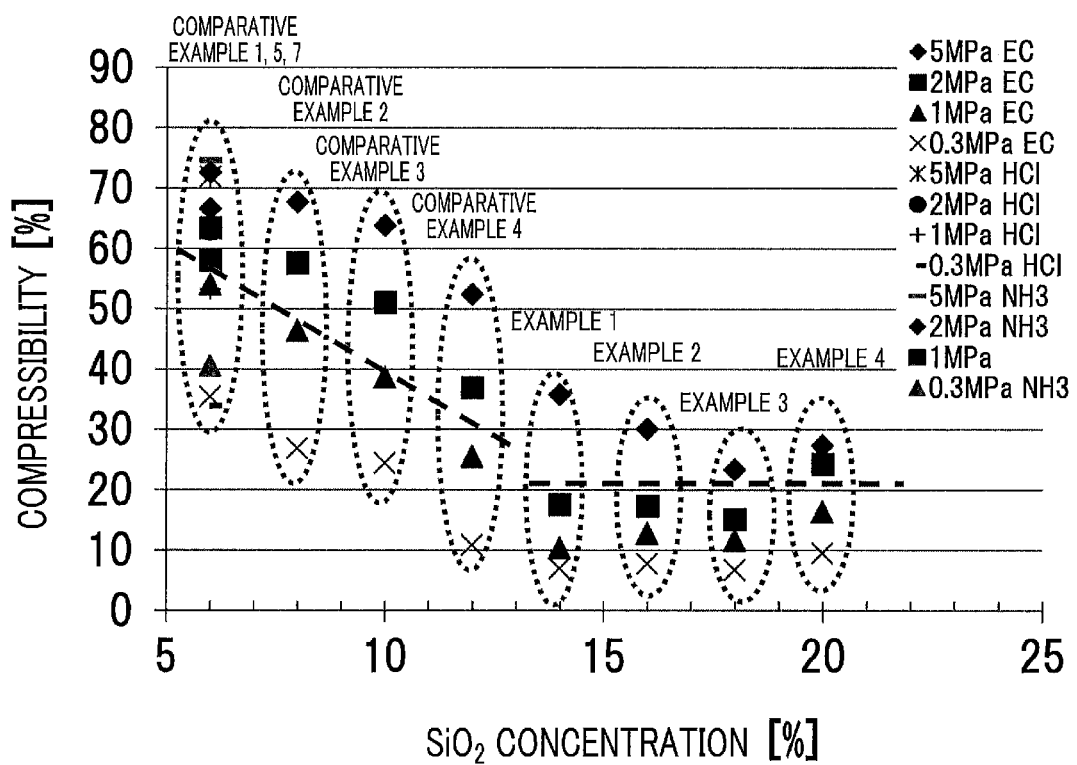
FIG. 10 illustrates the relation between the $SiO_2$ concentration of a water glass composition and the compressibility of a thermal insulation sheet at different pressing pressures in Embodiments.

FIG. 10 illustrates the relation between the silica concentration of the water glass composition in production of a thermal insulation sheet and the compressibility of the resulting thermal insulation sheet for thermal insulation sheets produced in Examples and Comparative Examples. A pressure of 5 MPa to 0.3 MPa was applied to each thermal insulation sheet. When a pressure of 5 MPa was applied, the compressibility of the thermal insulation sheet in each of Examples 1 to 4 was a preferred value of 40% or lower. When a pressure of 2 MPa was applied, the compressibility of the thermal insulation sheet in each of Examples 1 to 4 was a more preferred value of 30% or lower. When a pressure of 1 MPa was applied, the compressibility of the thermal insulation sheet in each of Examples 1 to 4 was an even more preferred value of 20% or lower. The thermal resistance in compressing had a similar tendency. The thermal insulation sheet in each of Examples 1 to 4 exhibited a thermal resistance of 0.010 $m^2K/W$ or higher when a pressure of 0.30 to 5.0 MPa was applied.

<Summary of Results>

As described above, in Examples 1 to 4, thermal insulation sheets were produced with the water glass composition having a silica concentration of 14 to 20 wt % and ethylene carbonate. The results showed that the compressibility was as small as 40% or lower at 5.0 MPa for all cases and the thermal resistance value was 0.01 $m^2K/W$ or higher for all cases. In Comparative Examples 1 to 4, on the other hand, thermal insulation sheets were produced with the water glass composition having a silica concentration of 6 to 12 wt % and ethylene carbonate. The results showed that the compressibility was higher than 40% at 5.0 MPa for all cases.

In Comparative Examples 5 and 6, thermal insulation sheets were produced with the water glass composition having a silica concentration of 6 wt % and aqueous solution of hydrochloric acid or aqueous ammonia as a gelling agent, and the results were almost the same as that for Comparative Example 1. When a gelling agent other than ethylene carbonate was used, homogenous gelling did not occur at an elevated silica concentration of 8 wt % or higher, resulting in failure in production of a thermal insulation sheet.

From the above results, the thermal insulation sheet consisting of a high-density aerogel-nonwoven fabric synthesized by using a water glass composition having a silica concentration of 14 to 20 wt % and a carbonate ester was revealed to be superior as a high-strength thermal insulation sheet, and effective for preventing thermal propagation even under high load conditions.

<Others>

The thermal insulation sheet includes an aerogel and a nonwoven fabric as primary components, and does not include any other compound as a primary component. The total weight of the aerogel and the nonwoven fabric accounts for 90 wt % or higher of the weight of the entire thermal insulation sheet.

Figure 11:
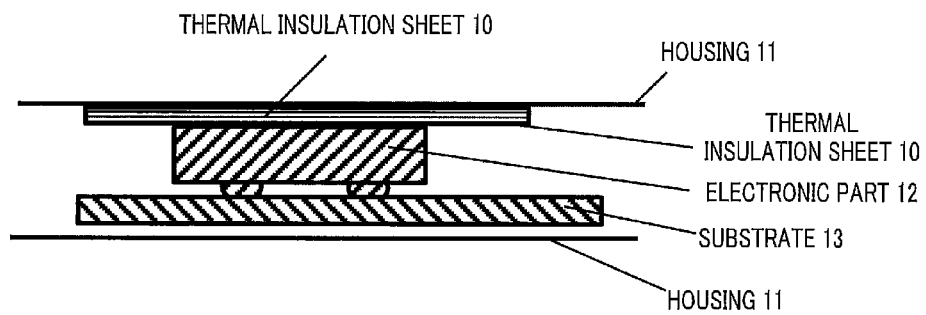
FIG. 11 shows a cross-sectional diagram of an electronic device as Application Example of a thermal insulation sheet in Embodiments.

FIG. 11 shows Application Example 1 of the thermal insulation sheet in Embodiments. FIG. 11 schematically illustrates the configuration of an electronic device including electronic part 12 having a heat generating property and housing 11. Thermal insulation sheet 10 in Embodiments can be disposed between electronic part 12 having a heat generating property and housing 11. Thermal insulation sheet 10 in Embodiments does not transmit heat generated from electronic part 12 to housing 11. Electronic part 12 is mounted on substrate 13. Thermal insulation sheet 10 may be covered with a cover to cover the surface. A thermally conductive material such as a graphite sheet may be laminated on thermal insulation sheet 10.

Figure 12:
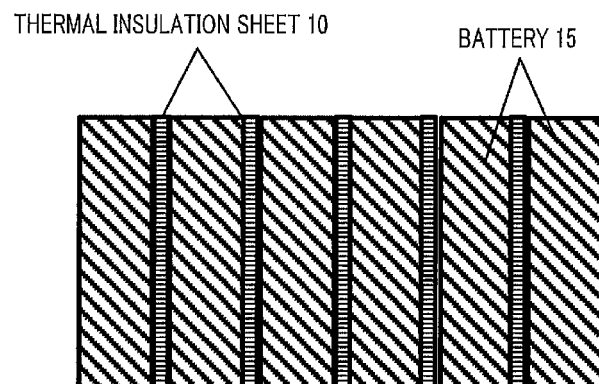
FIG. 12 shows a cross-sectional diagram of a battery unit as Application Example of a thermal insulation sheet in Embodiments.

FIG. 12 shows Application Example 2 of the thermal insulation sheet in Embodiments. FIG. 12 illustrates a battery unit including a plurality of batteries, for example, for automobiles. It is preferable to dispose thermal insulation sheet 10 in any of Embodiments between neighboring batteries 15 because not only thermal insulation between batteries 15 but also prevention of fire propagation can be achieved. Application of batteries 15 is not limited to automobiles. Batteries 15 may be batteries for mobile objects or batteries for power storage apparatuses for home use. Thermal insulation sheet 10 may be used as a composite with another sheet or the like.

INDUSTRIAL APPLICABILITY

The thermal insulation sheet in Embodiments, which consists of at least two components of a high-density aerogel and a nonwoven fabric and has enhanced compressive strength, can be widely used because the thermal insulation sheet can exhibit sufficient thermal insulation effect even in a small space in an electronic device, a device for automotive use, or a device for industrial use. The thermal insulation sheet is applicable to all products associated with heat such as information devices, portable devices, displays, and electrical components.

REFERENCE SIGNS LIST

10 Thermal insulation sheet
11 Housing
12 Electronic part
13 Substrate
15 Battery
101 Sodium silicate
102 Hydroxy ion
103 Ethylene carbonate
104 Carbonate ion
105 Ethylene glycol
106 Hydrogel
107 Sodium carbonate

The invention claimed is:

1. A thermal insulation sheet comprising:
   an aerogel; and
   fibers made of at least one material selected from the group consisting of an inorganic material, a resin material, and a natural material,
   wherein a compressibility of the thermal insulation sheet at 5.0 MPa is 40% or lower.

2. The thermal insulation sheet according to claim 1, wherein a thermal resistance of the thermal insulation sheet in compressing at 5.0 MPa is 0.01 m$^2$K/W or higher.

3. The thermal insulation sheet according to claim 1, wherein:
   a specific surface area of the aerogel is 300 m$^2$/g or larger and 600 m$^2$/g or smaller, and
   a pore volume of the aerogel is smaller than 1.5 ml/g.

4. The thermal insulation sheet according to claim 1, wherein a bulk density of the thermal insulation sheet is 0.3 g/cm$^3$ or higher and 0.5 g/cm$^3$ or lower.

5. The thermal insulation sheet according to claim 1, wherein a weight proportion of the aerogel in the thermal insulation sheet is 50 wt % or higher.

6. The thermal insulation sheet according to claim 1, wherein a weight proportion of the aerogel in the thermal insulation sheet is 50 wt % or higher and 80 wt % or lower.

7. An electronic device comprising:
   the thermal insulation sheet according to claim 1;
   an electronic part having a heat generating property; and
   a housing,
   wherein the thermal insulation sheet is disposed between the electronic part and the housing.

8. A battery unit comprising:
   the thermal insulation sheet according to claim 1; and
   a plurality of batteries,
   wherein the thermal insulation sheet is disposed between two adjacent batteries among the plurality of batteries.

9. A thermal insulation sheet comprising:
   a porous body including silica; and
   fibers made of at least one material selected from the group consisting of an inorganic material, a resin material, and a natural material,
   wherein a compressibility of the thermal insulation sheet at 5.0 MPa is 40% or lower.

10. The thermal insulation sheet according to claim 9, wherein a thermal resistance of the thermal insulation sheet in compressing at 5.0 MPa is 0.01 m$^2$K/W or higher.

11. The thermal insulation sheet according to claim 9, wherein:
    a specific surface area of the porous body is 300 m$^2$/g or larger and 600 m$^2$/g or smaller, and
    a pore volume of the porous body is smaller than 1.5 ml/g.

12. The thermal insulation sheet according to claim 9, wherein a bulk density of the thermal insulation sheet is 0.3 g/cm$^3$ or higher and 0.5 g/cm$^3$ or lower.

13. The thermal insulation sheet according to claim 9, wherein a weight proportion of the porous body in the thermal insulation sheet is 50 wt % or higher.

14. The thermal insulation sheet according to claim 9, wherein a weight proportion of the porous body in the thermal insulation sheet is 50 wt % or higher and 80 wt % or lower.

15. An electronic device comprising:
    the thermal insulation sheet according to claim 9;
    an electronic part having a heat generating property; and
    a housing,
    wherein the thermal insulation sheet is disposed between the electronic part and the housing.

16. A battery unit comprising:
    the thermal insulation sheet according to claim 9; and
    a plurality of batteries,
    wherein the thermal insulation sheet is disposed between two adjacent batteries among the plurality of batteries.

17. A thermal insulation sheet comprising a thermal insulation material having a sheet shape, wherein:
    a thickness of the thermal insulation sheet is in a range from 0.03 mm to 3.0 mm, inclusive,
    a compressibility of the thermal insulation sheet at 5.0 MPa is 40% or lower, and
    a thermal resistance of the thermal insulation sheet in compressing at 5.0 MPa is 0.01 m$^2$K/W or higher.

18. The thermal insulation sheet according to claim 17, wherein a bulk density of the thermal insulation sheet is 0.3 g/cm$^3$ or higher and 0.5 g/cm$^3$ or lower.

19. An electronic device comprising:
    the thermal insulation sheet according to claim 17;
    an electronic part having a heat generating property; and
    a housing,
    wherein the thermal insulation sheet is disposed between the electronic part and the housing.

20. A battery unit comprising:
    the thermal insulation sheet according to claim 17; and
    a plurality of batteries,
    wherein the thermal insulation sheet is disposed between two adjacent batteries among the plurality of batteries.

* * * * *